United States Patent [19]
Yamanaka et al.

[11] 3,872,475
[45] Mar. 18, 1975

[54] METHOD AND APPARATUS FOR MEASURING DISTANCE TO MOVING TARGET

[75] Inventors: Teruo Yamanaka, Nagoya; Kazuo Sato, Toyota, both of Japan

[73] Assignees: Toyota Jidosha Kogyo Kabushiki Kaisha; Kabushiki Kaisha Toyota Chuo Kenkyusho

[22] Filed: Dec. 29, 1972

[21] Appl. No.: 319,472

[30] Foreign Application Priority Data
Dec. 31, 1971 Japan.................................. 47-2476

[52] U.S. Cl................................. 343/14, 343/12 R
[51] Int. Cl............................................. G01s 9/24
[58] Field of Search.................. 343/7.7, 8, 12 R, 14

[56] References Cited
UNITED STATES PATENTS

| | | | |
|---|---|---|---|
| 3,659,293 | 4/1972 | Gupta | 343/12 R X |
| 3,750,171 | 7/1973 | Faris | 343/12 R X |
| 3,750,172 | 7/1973 | Tresselt | 343/12 R |

*Primary Examiner*—T. H. Tubbesing

[57] ABSTRACT

A method and apparatus for measuring a distance to a moving target of the type using frequency-modulated continuous waves. A mixing means mixes a transmitted wave and a reflected wave so as to derive a low frequency wave. A separating means separates a first Doppler signal from the low frequency wave. Another separating means separates a fundamental wave component and harmonic components from the low frequency wave and separates additional Doppler signals therefrom. Selecting means are provided to select from said first and additional Doppler signals at least two Doppler signals which are different in phase from each other. A reference time detecting means detects a reference time of one of said at least two Doppler signals in one period. The time detecting mean detects a time when the intensities of said at least two Doppler signals are equal to each other in one period. The time interval detecting means detects a time interval between the reference time and the time when the intensities of said at least two Doppler signals are equal to each other in one period. A calculating means is provided to calculate a ratio between said time interval and a period of said at least two Doppler signals to measure a distance to the target.

13 Claims, 10 Drawing Figures

— DISTANCE

| FIG. 6A | FIG. 6B | FIG. 6C |

METHOD AND APPARATUS FOR MEASURING DISTANCE TO MOVING TARGET

BACKGROUND OF THE INVENTION

The present invention relates to a method and apparatus for measuring the distance to a moving target.

In the conventional frequency-modulated or FM radar system, the range is determined by comparing the frequency of the echo with that of the transmitter, the difference being proportional to the distance to the target. However, the FM radar system inherently, has a fixed error given below:

$$\Delta R = C/8\Delta f$$

where C = velocity of radiation wave; and
$\Delta f$ = frequency deviation.

With a frequency deviation of 10 MHz, the fixed error $\Delta R$ will be of the order of four meters, which is a large error in measuring the distance to a target at a distance of only a few hundred meters from the radar system. Therefore in order to measure the distance to a target at a very small distance of about a few meters, the frequency deviation $\Delta f$ must be greatly increased and extremely difficult technical problems are presented on the radar system operating on a certain frequency band.

SUMMARY OF THE INVENTION

The present invention was made to overcome the above and other problems encountered in the prior art FM-CW radar systems, and has for its object to provide a method and apparatus for measuring a distance to a moving target of the type using frequency-modulated continuous waves which is capable of measuring the distance to a target at close distances from the apparatus or antenna without greatly increasing a frequency deviation $\Delta f$. It should be understood that the method and apparatus in accordance with the present invention may be used only when a target or object is moving relative to the apparatus or antenna.

The underlying principle of the present invention for measuring the distance between a target and a distance measuring apparatus uses a the transmitted signal which is frequency modulated by a sine wave. As with the conventional FM-CW radar systems, the echo signal S which is the wave transmitted from an antenna and reflected back from a target or object is mixed with a part of the transmitted wave or reference wave $R_0$ so as to derive a low frequency wave or difference frequency signal e which may be written $$e = r \cos \left\{ \omega_c \Delta t + 2m_f \sin \frac{\omega_m \Delta t}{2} \cos \left( \omega_m t + \frac{\omega_m \Delta t}{2} \right) \right\}$$

$$= r \cos \omega_c \Delta t \left\{ J_0(m_r) + 2 \sum_{n=1}^{\infty} (-1)^n \cos 2n \left( \omega_m t + \frac{\omega_m \Delta t}{2} \right) \times J_{2n}(m_r) \right\}$$

$$- r \sin \omega_c \Delta t \left[ 2 \sum_{n=0}^{\infty} (-1)^n \cos \left\{ (2n+1) \times \left( \omega_m t + \frac{\omega_m \Delta t}{2} \right) \right\} \times J_{2n+1}(m_r) \right]$$

(1)

where $r$ = coefficient which is determined depending upon the reflection factor of a target, the characteristics of the mixer and the like;
$\omega_c$ = angular frequency of the carrier wave;
$\Delta t$ = transit time, that is time duration for the wave to travel out and back;
$m_f$ = frequency modulation index;
$\omega_m$ = angular frequency of modulated wave; and
$J_{2n}$ = Bessel function of 2n order of the first kind. The frequency modulation index $m_f$ is given by $$m_f = 2\pi \Delta f/\omega_m$$

and $m_r$ is given by $$m_r = 2m_f \sin \omega_m \Delta t/2 \quad (2)$$

where $\Delta t = 2R/C \quad (3)$

R = distance to a target from the antenna, and
C = velocity of propagation wave.

The low frequency wave $e$ expressed in Eq. (1) is filtered by a band-pass filter to be described hereinafter into the individual frequency components such as a Doppler signal component, a fundamental wave component and harmonic components:

$rJ_0(m_r) \cos\omega_c\Delta t$,
$-2rJ_1(m_r) \cos(\omega_m t + \omega_m\Delta t/2) \sin\omega_c\Delta t$,
$-2rJ_2(m_4) \cos(2\omega_m t + \omega_m\Delta t)\cos\omega_c\Delta t$, The Doppler angular frequency $\omega_d = 2v\omega_c/C$ (where $v$ is the relative velocity of the target with respect to the antenna) is so selected as to satisfy the following condition $$\omega_m >> \omega_d$$

so that the maximum values of the frequency components separated by the band-pass filter become $rJ_0(m_r)$,
$2rJ_1(m_r)$,
$2rJ_2(m_r)$, The amplitudes $J_0(m_r)$, $J_1(m_r)$, $J_2(m_r)$, ... are determined by $\Delta t$, i.e., by the distance to the target, and $r$ is a constant defined above. Therefore, the ratios between the amplitudes of the frequency components are independent of the constant $r$.

The FM-CW radar system in accordance with the present invention is based upon the above principle so that the distance to the target at an extremely small distance may be measured by digital signal processing utilizing timing pulses independently of the absolute intensity of the signal which is influenced by the sensitivity, gains, etc., of the transmitter and receiver system.

Figure 1:
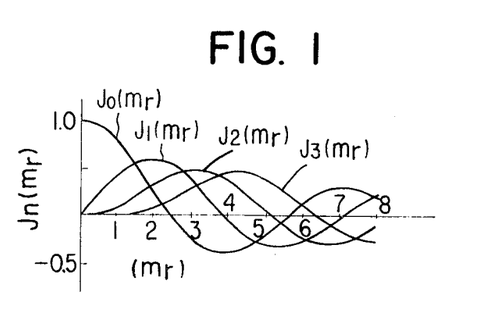
FIGS. 1 – 4 illustrate the various waveforms of the signals used for explaining of the underlying principle of the present invention.
Figure 2:
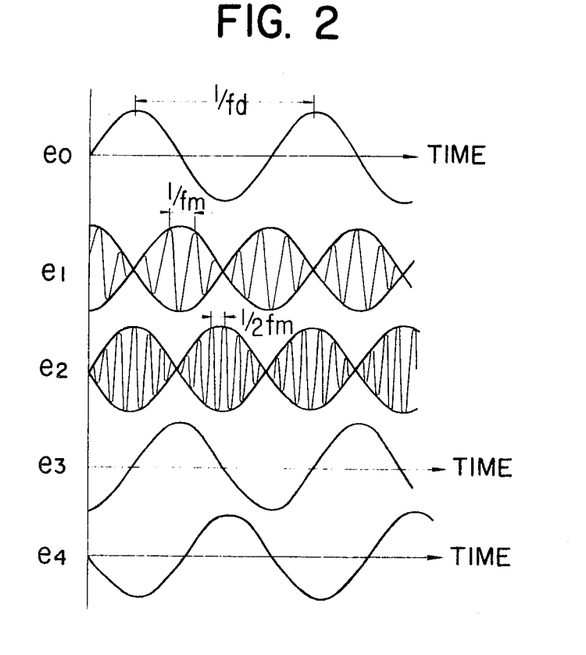

DESCRIPTION OF THE PREFERRED EMBODIMENT:

First referring to FIG. 1 illustrating the relation between $m_r$ and $J_n(m_r)$, it is seen that the amplitudes vary in proportion to the Bessel function $J_n(m_r)$ as $m_r$ varies. As seen from Eqs. (2) and (3), $m_r$ is a function of $\Delta t$, that is, the distance R to the target, when the frequency deviation $\Delta f$ and the angular velocity $\omega_m$ are determined. Hence it becomes possible to determine the distance R to the target from the ratios between the amplitudes of the Bessel function $J_0, J_1, J_2, \ldots$ FIG. 2 shows schematically the waveforms of the signals $J_0$, $J_1$ and $J_2$ when the target at a distance R from the antenna is moving at a relative velocity $v$, and the waveforms of the signals obtained by passing the signals $J_0$, $J_1$ and $J_2$ through filters which will not pass an angular frequency higher than the angular frequency $\omega_m$ of the modulated wave; FIG. 2-$e_0$ shows the waveform of the Doppler signal with the amplitude of $rJ_0(m_r)$; FIG. 2-$e_1$, the waveform of the fundamental wave with the amplitude $2rJ_1(m_r)$ which is amplitudemodulated by the Doppler angular frequency $\omega_d$; FIG. 2-$e_2$, the waveform of the harmonic with the amplitude $2rJ_2(m_r)$ which is amplitude-modulated by the Doppler angular frequency $\omega_d$; FIG. 2-$e_3$, the waveform of the signal which is obtained by demodulating the signal $e_1$ by the angular frequency $\omega_m$ of the modulated wave; and FIG. 2-$e_f$, the waveform of the signal which is obtained by demodulating the signal $e_2$ by the wave of the frequency two times the angular frequency $\omega_m$.

As seen from Eq. (1), the signal $e_3$ is different in phase by 90° from the signal $e_0$ and the signal $e_4$ is different in phase by 180° from the signal $e_0$.

Figure 3:
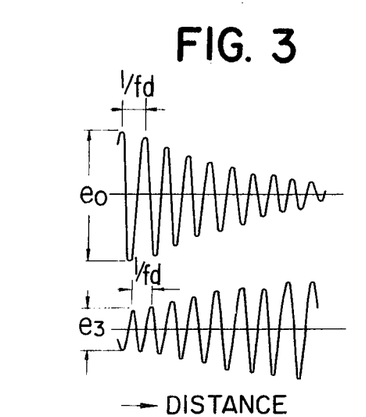

FIG. 3 shows the waveforms of the signals $e_0$ and $e_3$ when the target is moving toward or away from the antenna at the velocity $v$. The frequency $f_d$ of the signals $e_0$ and $e_3$ is proportional to the relative velocity $v$. The phase of the signal $e_3$ advances by 90° relative to that of the signal $e_0$ when the target is moving toward the antenna, but lags behind by 90° when the target is moving away from the antenna. The amplitudes of the signals $e_0$ and $e_3$ vary in proportion to $J_0(m_r)$ and $J_1(m_r)$, respectively.

Figure 4:
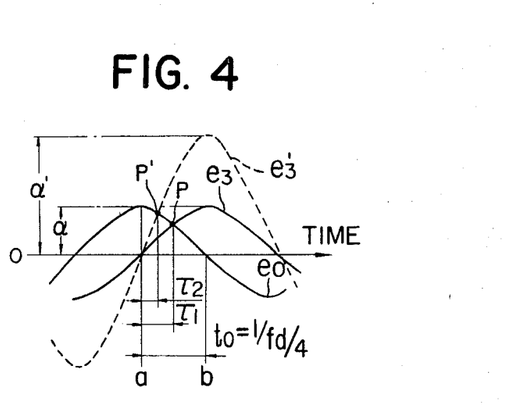
Figure 5:
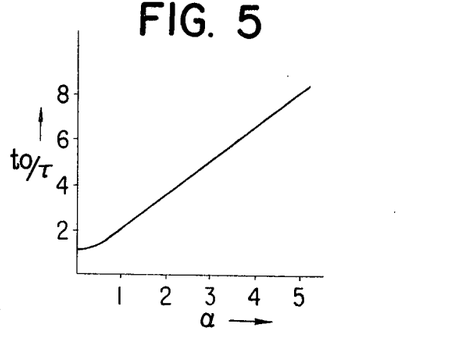
FIG. 5 is a graph illustrating the relation between $\alpha$ and $t_0/\tau$ also used for explanation of the underlying principle of the present invention.

FIG. 4 shows the relation between the parts of the signals $e_0$ and $e_3$ shown in FIG. 3. That is, the waveform indicated by $e_3'$ is the signal when the target is away from the position at which the signal $e_3$ is derived. It is seen that the amplitude varies depending upon the distance R to the target. The time interval $t_0$ between the point $a$ at which the signal $e_0$ has the maximum amplitude and the signal $e_3$ or $e_3'$ crosses the zero level and the point $b$ at which the signal $e_3$ or $e_3'$ has the maximum amplitude and the signal $e_0$ crosses the zero level (in principle, the point in time at which the amplitude of one signal is maximum and the point at which the other signal crosses the zero point coincide with each other so that the term "zero cross point" at which the signal crosses the zero level will be used in this specification), is in inverse proportion to the Doppler signal frequency $f_d$, that is, the relative velocity $v$ of the target. In FIG. 4, the signal $e_3$ is shown as being lagging in phase by 90° relative to the signal $e_0$ as the target is moving away from the antenna, but it will be readily seen that when the target is moving toward the antenna, the signal $e_3$ leads by 90° relative to the signal $e_0$. The point at which the signals $e_0$ and $e_3$ intersect and the point at which the signals $e_0$ and $e_3'$ intersect, that is the point at which the intensities of the signals $e_0$ and $e_3$ are equal and the point at which the intensities of the signals $e_0$ and $e_3'$ are equal, are designated by P and P', respectively. Then the time intervals $\tau_1$ and $\tau_2$ between the points $a$ and P and the points $a$ and P', respectively, are given by $\tau_1 = t_0(1 - 2\tan^{-1}\alpha/\pi)$, and $\tau_2 = t_0(1 - 2\tan^{-1}\alpha'/\pi)$ where $\alpha$ ($\alpha'$) is the ratio between the amplitudes or intensities of the signals $e_3$ ($e_3'$) and $e_0$. $t_0$ is equal to one quarter of the wavelength of $f_d$, that is, the time equal to one quarter of the period. The relation between $t_0/\tau$ and the ratio $\alpha$ when the amplitude of the signal $e_0$ is 1 is shown in FIG. 5. It is seen that when $\alpha = 1$, that is, when the amplitude of the signal $e_3$ equals that of the signal $e_0$, $t_0/\tau = 2$, that is, the signals $e_0$ and $e_3$ intersect at a point away from the point $a$ by 45° in phase, $t_0/\tau$ is substantially increased linearly as the ratio $\alpha$ increases up to 5. As will be described in more detail hereinafter, the gains of the amplifiers of the signals $e_0$ and $e_3$ are so selected that $\alpha$ may range between 1 and 5. Since $t_0/\tau_1$ and $t_0/\tau_2$ are a function of $\alpha$ and $\alpha'$ respectively, that is, a function of the distance, it may become possible to determine the distance to the target from $t_0/\tau_1$ and $t_0/\tau_2$. It is of course necessary that $\alpha$ must be varied within a range in which $\alpha$ is in proportion to the distance R to the target in order that $t_0/\tau$ may be in proportion to the distance R. Since the signals $e_0$ and $e_3$ are given by the Bessel function $J_0(m_r)$, $J_1(m_r)$, . . . . the range in which $t_0/\tau$ is in linear proportion to the distance R may be suitably selected.

In summary, the distance to the target which is moving toward or away from the antenna may be measured by measuring the time at which the intensities of the signals $e_0$ and $e_3$ equal each other as shown in FIG. 4 and the period $4t_0$ of the signal $e_0$ or $e_3$ and calculating $t_0/\tau$. So far, the underlying principle of the present invention has been described when a sine wave is used in frequency modulation, but it will be understood that any waveform similar to the sine wave such as a triangular waveform may be used in frequency modulation.

Figure 6A:
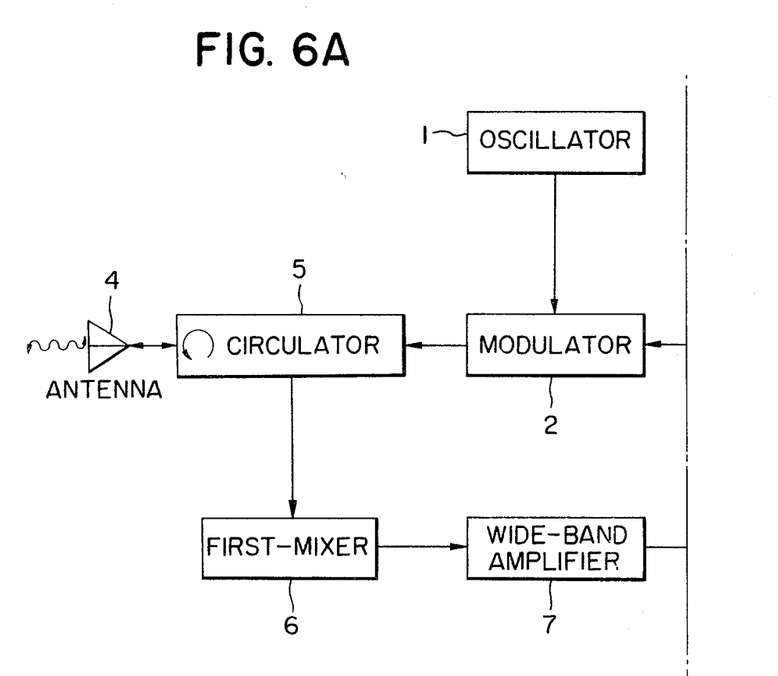
FIGS. 6A – 6C show a block diagrams of one preferred embodiment of the present invention.
Figure 6B:
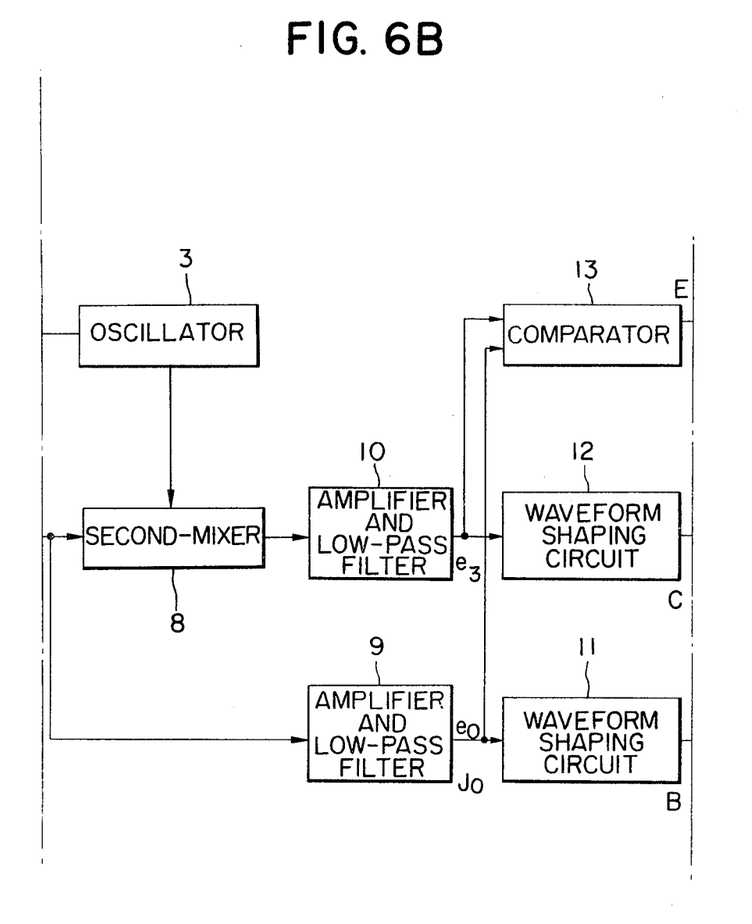
Figure 6C:
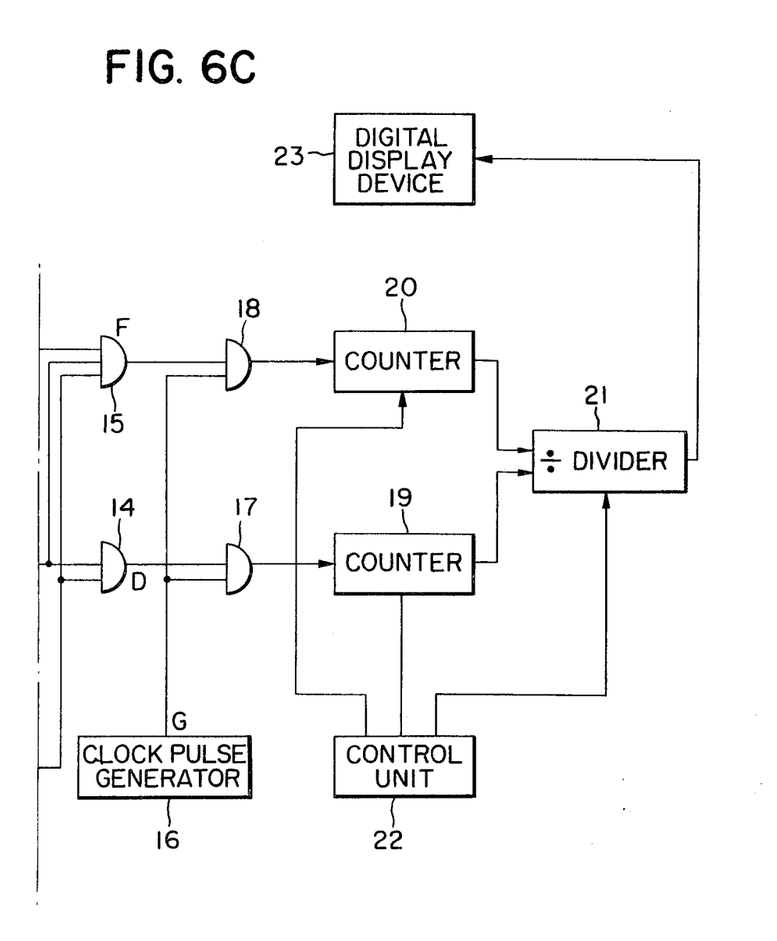
Figure 7:
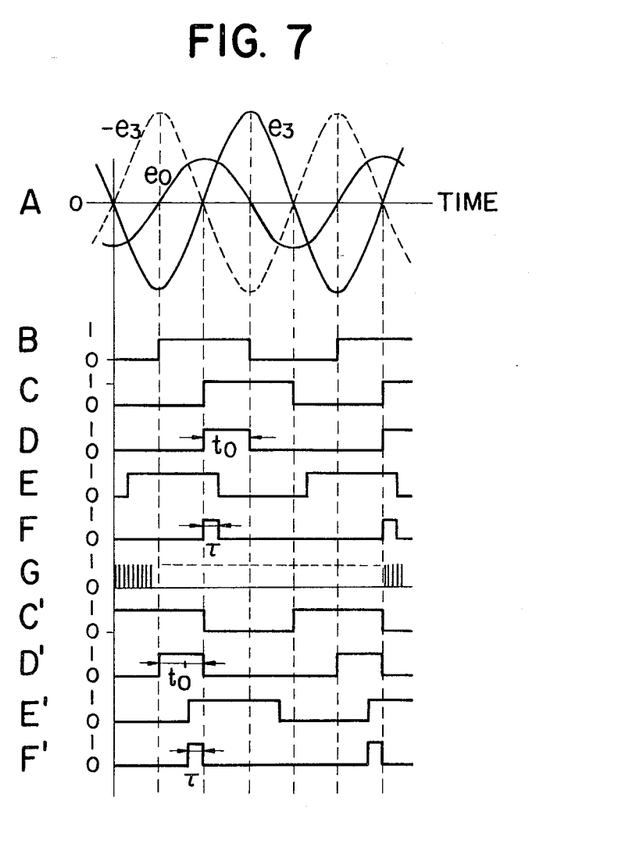
FIG. 7 shows the waveforms of the various signals obtained in the block diagram shown in FIGS. 6A – 6C.

EMBODIMENT, FIGS. 6 AND 7

Next referring to FIGS. 6 and 7, the first embodiment of the present invention will be described in detail hereinafter. First referring to FIG. 6, reference numeral 1 designates an oscillator for generating a carrier wave; 2, a modulator for frequency modulating the carrier wave by the modulating wave; 3, a modulating wave oscillator for generating the modulating wave of a frequency $f_m$ sufficiently higher than the Doppler signal frequency $f_d$; 4, an antenna for transmitting the wave to the target and receiving the echo reflected back from the target; 5, a circulator for feeding the output of the modulator to the antenna 4 and feeding the echo received by the antenna 4 to a first mixer 6 for mixing the echo with the wave from the modulator 2 so as to generate the low frequency or beat note; 7, a wide-band amplifier for amplifying the output of the mixer 6; 8, a second mixer for mixing the output signal of the wide-band amplifier 7 with the output of the modulating wave oscillator 3 so as to derive the signal in which the Doppler signal component is superposed upon the wave of a frequency higher than the modulation frequency; 9, a first amplifier and a low-pass filter for passing and amplifying only the Doppler signal $e_0$ (See FIG. 2); 10, a second amplifier and a low-pass filter for passing and amplifying only the signal $e_3$ (See FIG. 2); 11, a first waveform shaping circuit for generating the rectangular waveform signal so as to detect the zero-cross points of the Doppler signal $e_0$; 12, a second waveform shaping circuit for generating the rectangular waveform signal from the signal $e_3$; 13, a comparator for generating the rectangular waveform signal which rises during the time interval $\tau$ so as to detect cross points at which the signal $e_3$ intersects the signal $e_0$; 14, a first AND gate which provides a signal during the time interval $t_0$ (See FIG. 4); 15, a second AND gate which provides a signal output when the outputs of the comparator 13 and the waveform shaping circuits 11 and 12 are simultaneously applied during the time interval $\tau$; 16, a clock pulse generator; 17, a third AND gate for passing the clock pulse only when the output signal from the AND gate 14 is also applied; 18, a fourth AND gate similar to the AND gate 17 for passing the clock pulse only when the output signal from the AND gate 15 is applied thereto; 19, a counter for counting the clock pulses from the AND gate 17, that is counting the time $t_0$; 20, a counter for counting the clock pulses from the AND gate 18, that is, the time $\tau$; 21, a digital divider for dividing the output of the counter 19 by the output of the counter 20 to derive $t_0/\tau$; 22, a control unit for controlling the set and reset of the counters 19 and 20, and for controlling the operation of the divider 21; and 23, a digital display device for displaying the output of the divider 21.

Referring now to FIG. 7, the mode of operation will be described. FIG. 7A shows the waveforms of the output signals from the amplifiers 9 and 10 when the target is at a certain distance from the antenna 4. The signal $e_0$ corresponds to $J_0(m_r)$ and the signal $e_3$, to $J_1(m_r)$. The output signal from the waveform shaping circuit 11 is illustrated in FIG. 7B, and it is seen that the signal 1 is generated when the signal $e_0$ is in the positive half cycle. The output signal of the waveform shaping circuit 12 is illustrated in FIG. 7C. The output of the AND gate 14, that is the logic product of the output signals of the circuits 11 and 12 shown in FIGS. 7B and 7C is shown in FIG. 7D. The output of the comparator 13 which compares the signal $e_0$ with the signal $e_3$ (or $-e_3$), is shown in FIG. 7E. It is seen that the comparator 13 provides the signal 1 only when $e_0 > e_3$. The output of the AND gate 15, that is the logic product of the signals B, C and E, is shown in FIG. 7F. FIGS. 7C', 7D', 7E' and 7F' illustrate the waveforms of the signals corresponding to the signals shown in C, D, E, and F, respectively when the signal $e_3$ advances by 90° in phase relative to the signal $e_0$, that is when the target is relatively moving toward the antenna 4. The waveform of the clock pulses generated by the clock pulse generator 16 is shown in FIG. 7G. The clock pulses are fed and counted by the counters 19 and 20 only when the signals D and F are 1.

Thus, the counter 19 counts one quarter of the frequency of the Doppler signal, that is, the time $t_0$ by counting the clock pulses. In like manner, the counter 20 counts the time interval $\tau$ between the maximum amplitude point (in time) of the signal $e_0$ or the zero-cross point (in time) of the signal $e_3$ and the point in time at which the intensity of the signal $e_0$ equals that of the signal $e_3$ or $-e_3$. Then, the divider 21 generates $t_0/\tau$ from the output signals of the counters 19 and 20.

As described hereinbefore with reference to FIG. 5, $t_0/\tau$ varies linearly when $\alpha$, that is, the ratio in intensity of the signal $e_3$ to the signal $e_0$, varies in the range between 1 and 5. For example, when the portions of the $J_0(m_r)$ and $J_1(m_r)$ curves are selected in order that the ratio in intensity between them varies linearly (for example, the portions to the left from 2 on the abscissa of FIG. 1), the distance R to the target may be measured digitally by counting the clock pulses with a required accuracy. The linear region may be selected also by suitably selecting the gain of the amplifiers 9 and 10 and/or the frequency deviation $\Delta f$. The accuracy in measuring the distance to the target may be suitably adjusted by selecting the frequency of the clock pulses.

Referring back to FIG. 7, when the target is moving away from the antenna, the pulses shown in FIGS. 7D and 7F rise at the same time. On the other hand, when the target is moving toward the antenna, the pulses shown in FIGS. 7D' and 7F' fall at the same time. Furthermore, the signals D and F are out of phase by 90° relative to the signals D' and F'. Therefore, from the above phase relations, it becomes possible to detect whether the target is moving toward or away from the antenna as will be described in more detail hereinafter with reference to FIG. 8.

Figure 8:
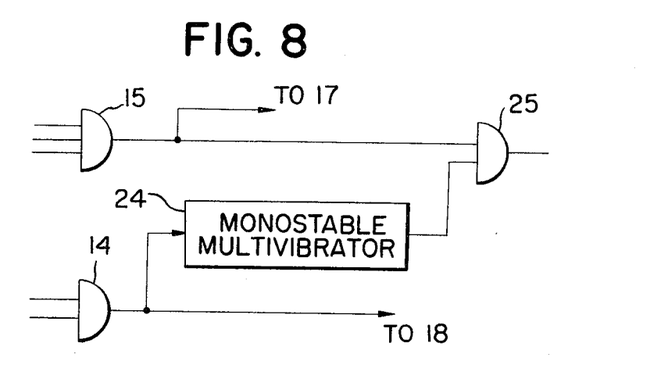
FIG. 8 is a circuit for detecting whether the target is moving toward or away from the antenna.

CIRCUIT FOR DETECTING WHETHER TARGET IS MOVING TOWARD OR AWAY FROM ANTENNA, FIG. 8

The circuit for detecting whether the target is moving toward or away from the antenna generally comprises a monostable multivibrator 24 which is triggered when the output (See FIG. 7) of the AND gate 14 (See FIG. 6) rises and generates the signal 1 for a time interval sufficiently shorter than $t_0$, and an AND gate 25 to which are applied the output of the monostable multivibrator 24 and the output (See FIG. 7F) of the AND gate 15. Therefore, the AND gate 25 provides an output the signal only when the target is moving away from the antenna.

So far, in the instant embodiment, the two Doppler signal components $e_0$ and $e_3$ which are different in phase from each other by 90° are selected in order to facilitate the signal processing. However, it should be understood that Doppler signal components which are different in phase from each other by any amount except 180° may be used and that three or more Doppler signal components may be selected in order to improve the accuracy of measuring the distance to the target.

Furthermore, in the instant embodiment, the time interval between the reference time and the time when the amplitudes or intensities of the Doppler signals equal each other as well as the period are measured digitally and their ratio is digitally processed. The above arrangement facilitates the signal processing and reduces the cost of the radar. But it should be understood that the time interval and the period may be measured in an analog manner, and their ratio may be also processed in an analog manner. This arrangement is advantageous especially when the distance to the target must be measured and displayed in an analog manner.

In the instant embodiment, the zero-crossing time of the two Doppler signals is measured in order to detect the one quarter period, $t_0$, to be employed as an embodiment of the period but it should be understood that the reference time may be determined by any suitable manner. For example, the reference time may be the time when the amplitude of the signal becomes the maximum.

From the foregoing description, it is seen that the FM-CW radar system in accordance with the present invention may measure the distance to the target which has been hitherto impossible to measure by the prior art radar systems. In the instant embodiment, $J_0$ and $J_1$ in Eq. (1) are used, but any frequency component such as $J_0$ and $J_3$ or $J_1$ and $J_2$ which are different in phase may be used. The gains of the amplifiers for the signals, the range of the measurable distance, the display device and its associated circuit may be suitably selected. The most important novel feature of the present invention is that the distance to the target may be measured by measuring the time interval from the intensities and phase relation based upon the observed fact that the relative intensity ratios between $J_0, J_1, J_2, \ldots$ of the low frequency wave vary in proportion to the distance to the target, and it should be understood that various modifications and variations may be effected without departing from the true spirit of the present invention.

What is claimed is:

1. A distance measuring method utilizing transmitted and reflected frequency-modulated continuous waves comprising,
    mixing a transmitted wave and a reflected wave so as to derive a low frequency wave,
    separating a first Doppler signal from said low frequency wave, separating a fundamental wave component and harmonic wave components from said low frequency wave, and separating additional Doppler signals therefrom, and selecting at least two Doppler signals from said first and additional Doppler signals which are different in phase from each other,
    detecting a reference time of one of said selected Doppler signals in one period,
    detecting a time when the intensities of said selected Doppler signals are equal to each other in one period,
    detecting a time interval between said reference time and said time when the intensities of said selected Doppler signals are equal to each other in one period,
    calculating a ratio between said time interval and a period of said selected Doppler signals thereby measuring a distance to a target.

2. A distance measuring method as defined in claim 1, further comprising
    detecting a phase relation between said at least two Doppler signals, thereby detecting a direction of a relative movement of the target.

3. A distance measuring apparatus utilizing transmitted and reflected frequency-modulated continuous waves comprising,
    means for mixing a transmitted wave and a reflected wave so as to derive a low frequency wave,
    means for separating a first Doppler signal from said low frequency wave, means for separating a fundamental wave component and harmonic components from said low frequency wave and for separating additional Doppler signals therefrom,
    means for selecting at least two Doppler signals from said first and additional Doppler signals which are different in phase from each other, means for detecting a reference time in one of said selected Doppler signals in one period,
    means for detecting a time when the intensities of said selected Doppler signals are equal to each other in one period,
    means for detecting a time interval between said reference time and said time when the intensities of said selected Doppler signals are equal to each other in one period, and
    means for calculating a ratio between said time interval and a period of said selected Doppler signals thereby measuring a distance to a target.

4. A distance measuring apparatus as defined in claim 3, further comprising
    means for detecting a phase relation between said at least two Doppler signals for detecting a direction of a relative movement of the target.

5. A distance measuring apparatus as defined in claim 3, comprising digital signal processing means for measuring said distance.

6. A distance measuring apparatus as defined in claim 3, comprising analog signal processing means for measuring said distance.

7. A distance measuring apparatus as defined in claim 5, further comprising
    means for detecting a phase relation between said at least two Doppler signals, thereby detecting a direction of relative movement of the target.

8. A distance measuring apparatus as defined in claim 6, further comprising
    means for detecting a phase relation between said at least two Doppler signals, thereby detecting a direction of relative movement of the target.

9. A distance measuring apparatus as defined in claim 5, wherein the means for selecting Doppler signals different in phase from each other comprises means for selecting at least two Doppler signals having a phase difference of 90°.

10. A distance measuring apparatus as defined in claim 7, wherein the means for selecting Doppler signals different in phase from each other comprise means for selecting at least two Doppler signals having a phase difference of 90°.

11. A distance measuring apparatus as defined in claim 9, wherein
    A. said mixing means comprises
        a. an oscillator for generating a carrier wave,
        b. a modulating wave oscillator for generating a modulating wave with a frequency sufficiently higher than the frequency of said Doppler signals,
        c. a modulator for frequency modulating said carrier wave by said modulating wave,
        d. an antenna for transmitting said frequency-modulated wave to a target and receiving the echo reflected back therefrom,
        e. a first mixer,
        f. a circulator for feeding the output of said modulator to said antenna and feeding the echo received by said antenna to said first mixer for mixing the echo with a part of the output from said modulator so as to derive said low frequency wave,
        g. a wide-band amplifier for amplifying the output of said first mixer, and
        h. a second mixer for mixing the output of said wide-band amplifier with the output of said modulating wave oscillator;
    B. said low frequency signal separating means comprises
        i. a first amplifier-and-low-pass filter for receiving the output of said wide-band amplifier and passing and amplifying only said first Doppler signal, and
        j. a second amplifier-and-low-pass filter for receiving the output of said second mixer and passing and amplifying only a Doppler signal component obtained from said fundamental wave component;

C. said reference time detecting means comprises
  k. a first waveform shaping circuit for generating the rectangular waveform signal which is at high level only when said first Doppler signal is in the positive half cycle so as to detect zero-crossing points of said first Doppler signal;
  l. a second waveform shaping circuit for generating the rectangular waveform signal which is at high level only when said additional Doppler signal obtained from said fundamental wave component is in the positive half cycle so as to detect zerocrossing points of said additional Doppler signal;
  m. a first AND gate to which are applied the outputs of said first and second waveform shaping circuits;
D. said time detecting means for detecting the time when said Doppler signals are equal comprises
  n. a comparator for deriving a rectangular waveform signal which is at high level only when the amplitude of said first Doppler signal is higher than that of said additional Doppler signal obtained from said fundamental wave component so as to detect points in time when said first Doppler signal and said additional Doppler signal obtained from said fundamental wave component are equal in amplitude;
  o. a second AND gate to which are applied the outputs of said comparator and said first and second waveform shaping circuits and which gives the output for a time interval between the zerocrossing point of said additional Doppler signal obtained from said fundamental wave component when it goes from the negative half cycle to the positive half cycle and the time when said first Doppler signal and said additional Doppler signal obtained from said fundamental wave component are equal in amplitude;
E. said time interval detecting means comprises
  p. a clock pulse generator, a third AND gate for passing the clock pulses only when the output of said first AND gate is applied thereto, a fourth AND gate for passing the clock pulses only when the output of said second AND gate is applied thereto, and
  q. counters for counting the clock pulses from said third and fourth AND gates, respectively;
F. said ratio calculating means comprises
  r. a digital divider for dividing the output of one of said counters by the output of the other, and
  s. a control/unit for controlling the operations of said counters and said digital divider.

12. A distance measuring apparatus as defined in claim 10, wherein
said phase relation detecting means comprises
  a. a monostable multivibrator which is triggered in response to the output of said first AND gate thereby giving the output "1" for a time considerably shorter than said time interval between said reference time and said time when said first Doppler signal and said additional Doppler signal obtained from said fundamental wave component are equal in amplitude, and
  b. a fifth AND gate to which are applied the outputs of said second AND gate and said monostable multivibrator.

13. A distance measuring apparatus as defined in claim 12, wherein
A. said mixing means comprises
  a. an oscillator for generating a carrier wave,
  b. a modulating wave oscillator for generating a modulating wave with a frequency sufficiently higher than the frequency of said Doppler signals,
  c. a modulator for frequency modulating said carrier wave by said modulating wave,
  d. an antenna for transmitting said frequency-modulated wave to a target and receiving the echo reflected back therefrom,
  e. a first mixer
  f. a circulator for feeding the output of said modulator to said antenna and feeding the echo received by said antenna to said first mixer for mixing the echo with a part of the output from said modulator so as to derive said low frequency wave,
  g. a wide-band amplifier for amplifying the output of said first mixer, and
  h. a second mixer for mixing the output of said wide-band amplifier with the output of said modulating wave oscillator;
B. said low frequency signal separating means comprises
  i. a first amplifier-and-low-pass filter for receiving the output of said wide-band amplifier and passing and amplifying only said first Doppler signal, and
  j. a second amplifier-and-low-pass filter for receiving the output of said second mixer and passing and amplifying only said additional Doppler signal obtained from said fundamental wave component;
C. said reference time detecting means comprises
  k. a first waveform shaping circuit for generating the rectangular waveform signal which is at high level only when said first Doppler signal is in the positive half cycle so as to detect zero-crossing points of said first Doppler signal;
  l. a second waveform shaping circuit for generating the rectangular waveform signal which is at high level only when said additional Doppler signal obtained from said fundamental wave component is in the positive half cycle so as to detect zerocrossing points of said additional Doppler signal;
  m. a first AND gate to which are applied the outputs of said first and second waveform shaping circuits;
D. said time detecting means for detecting the time when said Doppler signals are equal comprises
  n. a comparator for deriving a rectangular waveform signal which is at high level only when the amplitude of said first Doppler signal is higher than that of said additional Doppler signal obtained from said fundamental wave component so as to detect points in time when said first Doppler signal and said additional Doppler signal obtained from said fundamental wave component are equal in amplitude;
  o. a second AND gate to which are applied the outputs of said comparator and said first and second waveform shaping circuits and which gives the output for a time interval between the zerocrossing point of said additional Doppler signal obtained from said fundamental wave component when it goes from the negative half cycle to the positive half cycle and the time when said first Doppler signal and said additional Doppler signal obtained from said fundamental wave component are equal in amplitude;

E. said time interval detecting means comprises p. a clock pulse generator, a third AND gate for passing the clock pulses only when the output of said first AND gate is applied thereto, a fourth AND gate for passing the clock pulses only when the output of said second AND gate is applied thereto, and q. counters for counting the clock pulses from said third and fourth AND gates, respectively;

F. said ratio calculating means comprises r. a digital divider for dividing the output of one of said counters by the output of the other, and s. a control unit for controlling the operations of said counters and said digital divider.

* * * * *